(12) United States Patent
Gioira et al.

(10) Patent No.: US 8,671,979 B2
(45) Date of Patent: Mar. 18, 2014

(54) SYSTEM AND VALVE UNIT FOR MIXING-DELIVERY SANITARY WATER AND/OR PURIFIED WATER

(75) Inventors: Luigi Gioira, Oleggio Castello (IT); Marco Gioira, Oleggio Castello (IT)

(73) Assignee: GM Rubinetterie S.R.L., Oleggio Castello (IT)

( * ) Notice: Subject to any disclaimer, the term of this patent is extended or adjusted under 35 U.S.C. 154(b) by 0 days.

(21) Appl. No.: 13/339,603

(22) Filed: Dec. 29, 2011

(65) Prior Publication Data

US 2012/0168000 A1  Jul. 5, 2012

(30) Foreign Application Priority Data

Dec. 30, 2010  (IT) ............................... MI2010A2471

(51) Int. Cl.
  *F16K 11/10*  (2006.01)
(52) U.S. Cl.
  USPC ..................................... 137/599.14; 137/597
(58) Field of Classification Search
  USPC ............................ 137/597, 599.14; 210/433.1
  See application file for complete search history.

(56) References Cited

U.S. PATENT DOCUMENTS

| | | | | |
|---|---|---|---|---|
| 5,417,348 | A | * | 5/1995 | Perrin et al. ................ 222/129.1 |
| 6,219,860 | B1 | * | 4/2001 | Chang ............................... 4/678 |
| 8,343,338 | B2 | * | 1/2013 | Schmitt ........................... 210/134 |
| 2007/0246550 | A1 | * | 10/2007 | Rodenbeck et al. .......... 239/390 |
| 2009/0100594 | A1 | | 4/2009 | Chen et al. |

FOREIGN PATENT DOCUMENTS

| | | |
|---|---|---|
| EP | 0 577 164 A1 | 1/1994 |
| EP | 1 101 874 A1 | 5/2001 |
| EP | 1 154 083 A1 | 11/2001 |
| WO | 2004/104306 A1 | 12/2004 |
| WO | WO 2006072250 A1 * | 7/2006 |

* cited by examiner

*Primary Examiner* — John Rivell
*Assistant Examiner* — Angelisa Hicks
(74) *Attorney, Agent, or Firm* — Lucas & Mercanti, LLP

(57) ABSTRACT

The system comprises a valve unit connected to a filtering unit for the selective delivery of cold, hot and mixed sanitary water, respectively either refrigerated or boiling purified water with optional carbonation. The valve unit comprises a base body for housing a first mixer tap, of the cartridge type, which is connected to a first delivery duct of the sanitary water, as well as a second control tap for the purified water, connected to a second delivery duct internal to the previous one. The outlet or each outlet of the purified water of the filtering unit is connected to an inlet of the second control tap, whereas the inlet of the cold water of the filtering unit is directly connected to the inlet of the cold water of the first mixer tap, by means of a branched channel that is provided inside the base body of the valve unit.

4 Claims, 3 Drawing Sheets

SYSTEM AND VALVE UNIT FOR MIXING-DELIVERY SANITARY WATER AND/OR PURIFIED WATER

BACKGROUND OF THE INVENTION

The present invention relates to a system for the selective delivery of cold, hot and mixed as well as purified water, with optional carbonation by means of carbon dioxide, which is suitable to eliminate certain negative aspects of previously known systems, and also relates to a valve unit comprising a first mixer tap for delivering sanitary water, and a second tap for delivering purified water flowing from a filtering unit, wherein the valve unit is configured for being directly connected to the filtering unit.

PRIOR ART

Systems comprising a valve unit provided with two taps that allow for controlling both the delivery and the mixing of sanitary cold and hot water supplied by a supply network, and the delivery of purified sanitary water flowing from a filtering unit, have been known and widely used.

EP 1154083 discloses a kitchen mixer tap for supplying mixed hot/cold water for domestic use and purified water for cooking purposes.

These systems, however, require that the connection of the filtering and optional carbonation unit is carried out upstream of the mixer-delivery unit by providing a suitable T-shaped pipe-fitting and a ball valve for shutting off the flow, in the same piping connected to the supply line.

Such a solution has a number of disadvantages and drawbacks, besides being expensive, as a result of the operations that are required for the installation and connection of the various elements making up the system.

In fact, the necessary installation operations for connecting the mixer-delivery unit and filtering unit—which can be optionally provided with a refrigerating and/or carbonating device—to each other and to the water supply network require a certain work time that can vary depending on the skill level of the operator carrying out the installation.

The installation of a conventional system can also result unsafe, because the numerous connections can cause water leakages which are both due to a faulty connection of the pipe-fittings to each other, and to a possible unskilfulness of the operator.

OBJECTS OF THE INVENTION

The object of the present invention is to provide a different system for selectively delivering cold, hot and mixed sanitary water and/or refrigerated and/or boiling purified water, with optional carbonation, as well as a valve unit differently configured from conventional valve units such as to eliminate the inherent inconveniences of the prior-art systems and valve units.

The technical problem to be solved consists in finding a solution which requires installation times comparatively reduced, which is cost-effective while having a greater degree of safety by eliminating each possible cause of water leakage typical of the previously used systems.

BRIEF DESCRIPTION OF THE INVENTION

The most innovative aspect of the present invention consists of connecting both the inlet, and the outlet of the filtering unit to a valve unit configured with an inner supplying channel for supplying the sanitary cold water at the inlet of the filtering unit, the inner supplying channel being directly derived from the inlet duct for the sanitary water by simple mechanical working of the body of the valve unit.

BRIEF DESCRIPTION OF THE DRAWING

These and further characteristics and advantages of the present invention will appear from the following description, and from the example of the annexed drawings, in which.

DETAILED DESCRIPTION OF THE INVENTION

Figure 1:
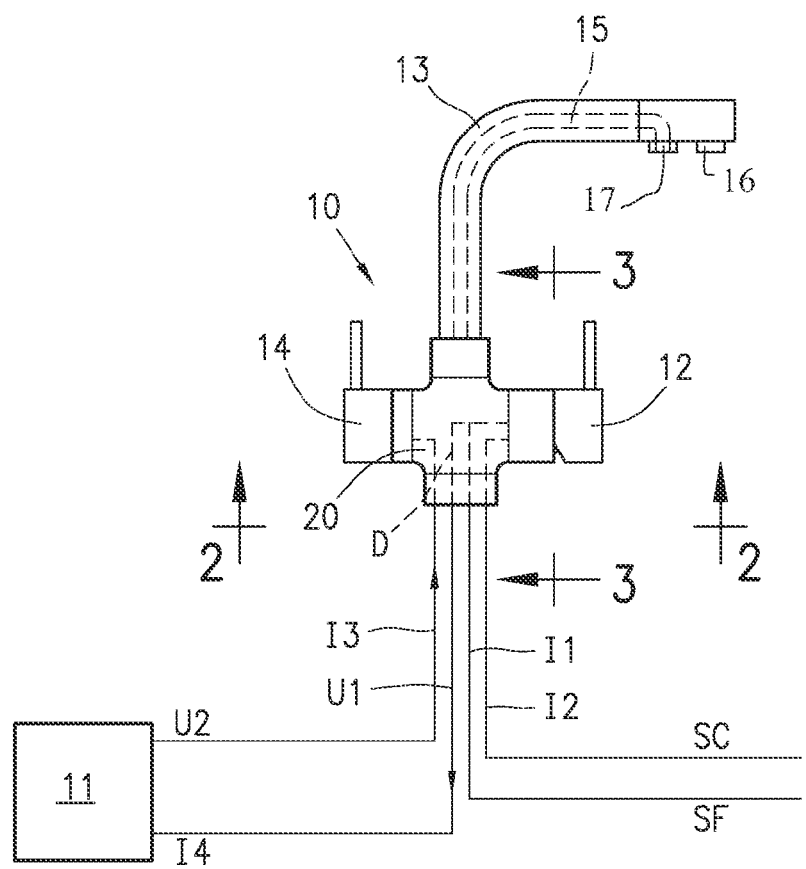
FIG. 1 is a diagram of the mixing/delivery system for cold, hot sanitary water as well as purified water according to the present invention.

With reference to FIG. 1, the system according to the present invention for the selective mixing and delivery of cold, hot and mixed cold/hot sanitary water, and/or refrigerated and/or boiling purified water, with optional carbonation by means of carbon dioxide, comprises a valve unit 10 for the delivery of sanitary water and purified water, and a filtering unit 11, which is optionally provided with a refrigeration and carbonation device known per se.

Particularly, the valve unit 10 comprises a first mixer tap 12 for selectively supplying cold, hot or mixed sanitary water to a first delivery duct 13, to first spout 16; the valve unit 10 further comprises a second tap 14 for the control of the flow of the purified water supplied by the filtering unit 11, which is delivered by means of a second duct 15, to second spout 17, either parallel to the first delivery duct 13 or internal thereto.

A first inlet I1 of the mixer tap 12 is connected to a source SF of cold sanitary water, which is part of a usual water supply network, whereas a second inlet I2 for the tap 12 is connected to a source SC of hot water which is a part of a usual heating system for a wall-mounted boiler or hot water reservoir.

Referring back to FIG. 1, with D has been schematically designated a channel branching from the inlet duct I1 of the cold sanitary water, which is directly machined in the body of the valve unit 10; the branched channel D ends with an outlet U1 for the sanitary cold water which is supplied to the inlet I4 of the filtering unit 11; the purified water, in turn, optionally refrigerated and/or charged with carbon dioxide gas, or refrigerated or boiling at a temperature of about (slightly lower or higher than) 90° C., from the outlet U2 of the filtering unit 11 is supplied to a respective inlet I3 of the control tap 14 for the purified water flow.

Accordingly, from the diagram in FIG. 1 it should be noted that by means of the system and valve unit 10 according to the invention, the following advantages are obtained:

no branch pipe is required to be created upstream of the valve unit 10 in order to connect the filtering unit 11 to the source SF of sanitary cold water, since the connection is allowed from the branched channel D which is obtained by means of simple machining, directly in the base body of the valve unit;

the assembly of the valve unit and the connection of the latter both to the water distribution system, and to the filtering unit, can be made in an easy and very quick manner even by a rather unskilled operator;

the solution is very cost-effective and substantially reduces any cause of water leakage that may be due to any defect or working errors, thereby maintaining well-established conditions of safety and reliability over time.

With reference to the remaining FIGS. 2 to 6, a preferred embodiment of the valve unit 10 according to the present invention will be described herein below.

As shown, the valve unit 10 comprises a base body 20, provided on the one side thereof with a first cylindrical seat 21 for accommodating the mixer tap 12 comprising a usual ceramic-disc cartridge 22, while on the opposite side thereof, it has a second cylindrical seat 23 for housing the tap 14 which can be of the ceramic-disc type, provided with an outlet for the purified water connected to the delivery duct 15, as well as with one or more outlets, each one connectable to an outlet of the filter 11 for cold purified possibly carbonated water, either refrigerated or boiling.

Figure 2:
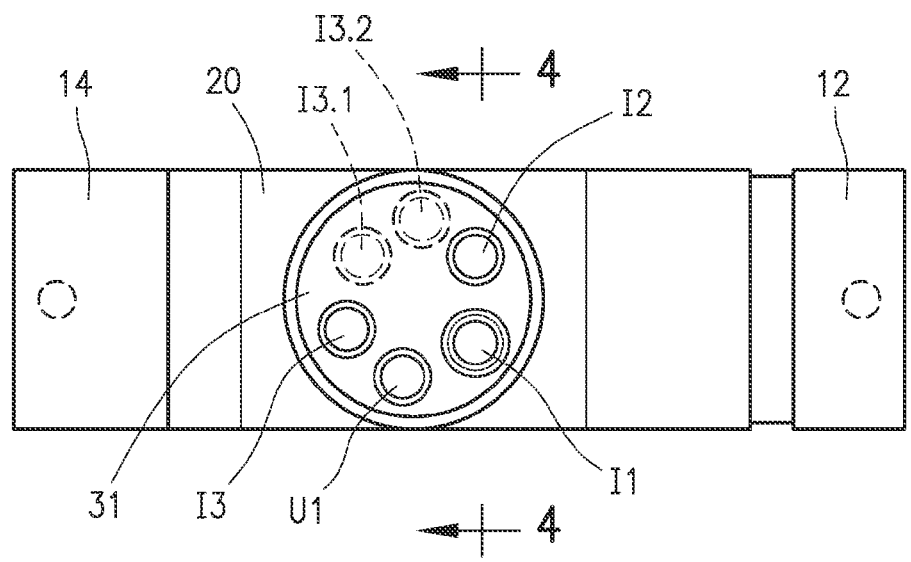
FIG. 2 is an enlarged view of the valve unit taken along the line 2-2 in FIG. 1.

To this purpose, in FIG. 2 the same numerals have been used as in FIG. 1 to designate similar or equivalent parts; furthermore, in FIG. 2 with I3, I3.1 and I3.2 have been schematically designated three possible outlets for three different types of purified water, for example cold purified water at the mains temperature, refrigerated and/or carbonated water with a preset amount of $CO_2$ gas, and/or boiling, as referred above.

Figures 3, 4:
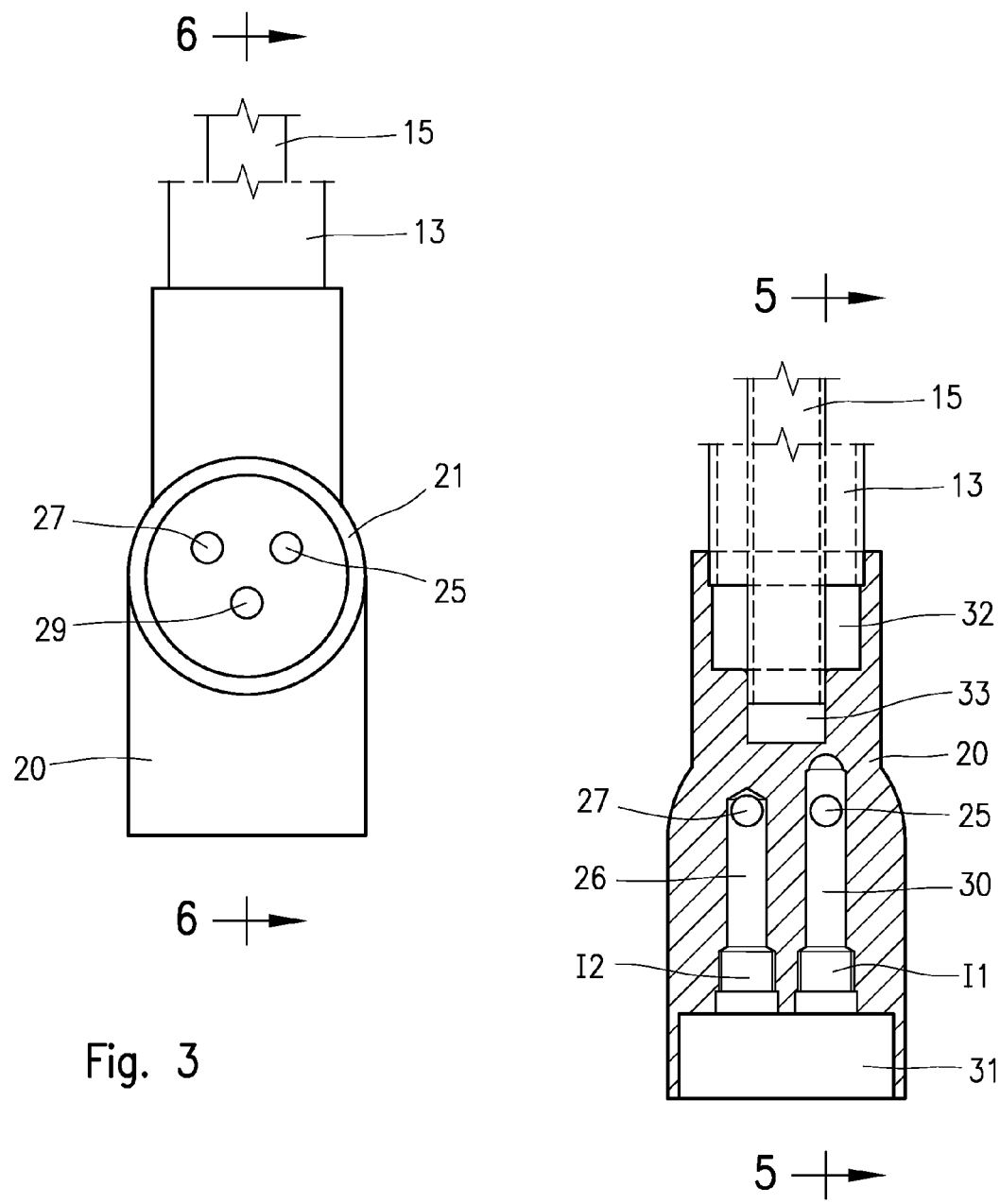
FIG. 3 is an enlarged view of the valve unit taken along the line 3-3 in FIG. 1.
FIG. 4 is a longitudinal section taken along the line 4-4 in FIG. 2.

FIG. 3 shows a view of the base body 20 of the valve unit 10, from the side of the housing seat 21 for the cartridge 22 of the mixer tap 12 of the sanitary water.

In FIG. 3, the arrangement of the passage holes for the sanitary water flows has been illustrated, which communicate with the cartridge 22 of the mixer tap 12. Particularly, with 25 the inlet hole for the sanitary cold water for the tap 12 has been indicated, with 27 the inlet hole for the hot sanitary water has been indicated, and with 29 the outlet hole for the mixed cold/hot sanitary water has been indicated; FIG. 4 shows, in turn, a longitudinal section at the inlet I1 for the cold sanitary water, and at the inlet I2 for the hot sanitary water, wherewith 25 and 27 the inlet holes through which the hot water enters the cartridge 22 of the tap 12 have been designated.

Figure 5:
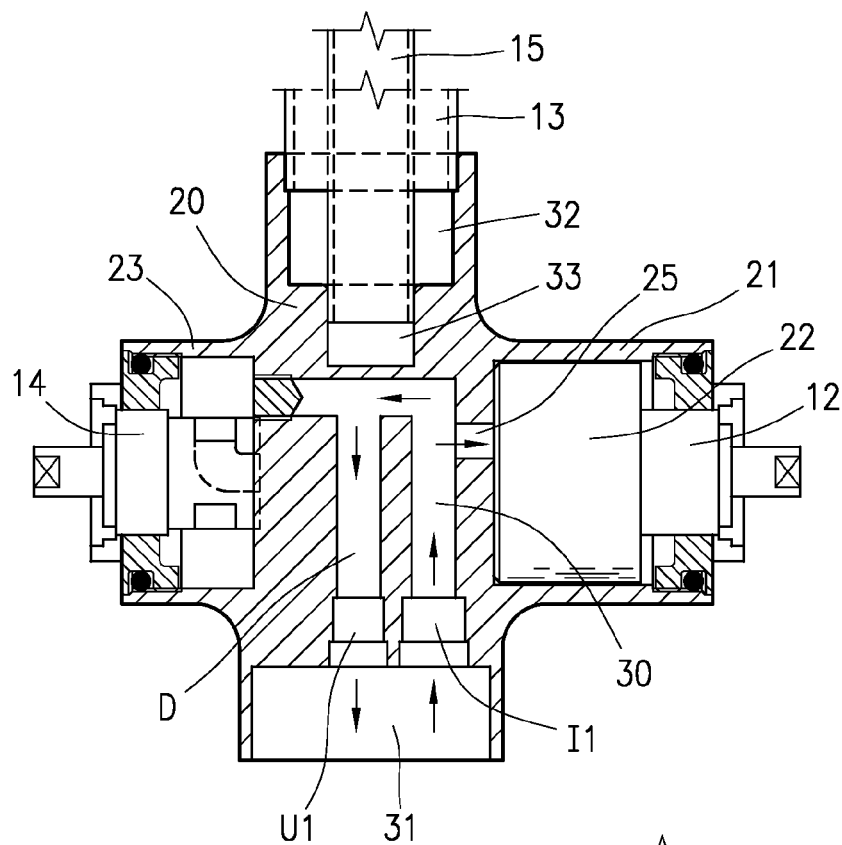
FIG. 5 is a longitudinal section taken along the line 5-5 in FIG. 4, at the inlet of the cold water.
Figure 6:
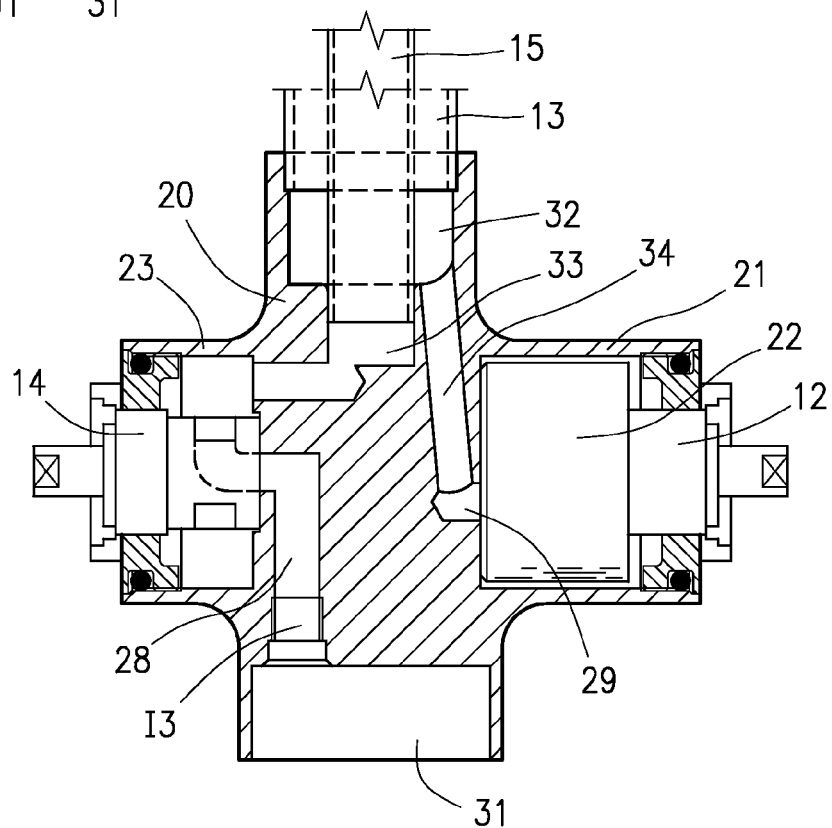
FIG. 6 is a longitudinal section in a plane parallel to that in FIG. 5, at the line 6-6 in FIG. 3.

The basic feature of the valve unit 10 according to the invention is shown in the sectional view in FIG. 5 in combination with the sections in FIG. 4 and FIG. 6, where the same numerals have been used to designate similar or equivalent parts.

As shown, the base body 20 of the valve unit 10 is, in addition to comprising the two seats 21 and 23 for housing the two taps 12 and 14, by means of simple mechanical drilling and/or milling operations is configured with a first longitudinal channel 26 connecting the hole 27 to the inlet I2, with a second channel 28 connecting the tap 14 to the inlet I4 and with a third longitudinal channel 30 connecting the hole 25 to the inlet I1, for example of the sanitary cold water; the channel 30 communicates on the one side thereof with the cartridge 22 through the hole 25, while on the opposite side it communicates with the branched channel D aligned to the outlet U1 that can be connected to the inlet I4 of the filtering unit 11. The different inlets I1, I2, I3 and the outlet U1 of the sanitary water and purified water open to a cylindrical cavity 31 at the lower end of the base body 20. Correspondingly, at the upper end of the base body 20, with 32 and 33 have been indicated two cylindrical cavities for connecting the taps to the delivery ducts 13 and 15.

Finally, FIG. 6 shows a longitudinal section in a plane passing through the outlet hole 29 for the sanitary water being mixed by the mixer 12, which communicates with a channel 34 leads into the cavity 32 defining the chamber that communicates with the delivery duct 15.

From what has been stated and illustrated in the drawings, it should be understood that the invention relates to a novel and original system for connecting a valve unit 10 delivering sanitary water and purified water, optionally carbonated with $CO_2$, and a filtering unit 11 for refrigerating and/or carbonating the purified water, by means of which the above-mentioned advantages are obtained. The basic features of the system and valve unit according to the invention being provided, it should be understood, however, that other modifications or variations can be carried out without departing from the claims below.

What we claim is:

1. A combined tap-group for a selective supply of hot, cold, mixed sanitary water and purified water, comprising
    a base body having a first delivery duct provided with a first spout for sanitary water and a second delivery duct provided with a second spout for purified water, said a second delivery duct extending parallel and coaxially to said first delivery duct along a first axis of said base body, said base body being conformed with
    a first seat for housing a mixer tap for delivering hot, cold and mixed sanitary water, said mixer tap being in communication with said first delivery duct and with a first inlet channel for cold water and with a second inlet channel for hot water in communication through the mixer tap with said first delivery duct, said first inlet channel for cold water and said second inlet channel for hot water being obtained inside said base body and extending parallel to said first axis from a lower end of said base body;
    a second seat for housing a control tap for controlling the flow of purified water, said control tap being in communication with at least one inlet channel for purified water and with the second delivery duct, said control tap and said mixer tap being place on opposite sides of said base body with respect to said first axis and being mutually aligned along a second axis transverse to said first axis;
    in said base body there being obtained an additional outlet channel for cold sanitary water, said additional outlet channel being directly machined inside the same base body and being branched from the first inlet channel for cold sanitary water, said additional outlet channel extending parallel to said first inlet channel and said second inlet channel.

2. The combined tap-group according to claim 1, wherein the control tap for the purified water flow is in communication with at least a second inlet for refrigerated, and/or carbonated, and/or boiling purified water.

3. The combined tap-group according to claim 2, wherein the second delivery duct for purified water extends inside the first delivery duct for sanitary water.

4. A system for a selective supply of hot, cold and mixed sanitary water and purified water, comprising:
    a filtering unit, with possible refrigeration and/or carbonation device, and or/heating device;
    a combined tap-group according to claim 1, hydraulically connected to the filtering unit, wherein the additional outlet channel for cold sanitary water is directly connected to an inlet for cold sanitary water of the filtering unit and at least one inlet for purified water provided in the combined tap-group is directly connected to a corresponding outlet for purified water of the filtering unit.

* * * * *